Sept. 20, 1966     H. M. CANTERBURY     3,273,717
COMBINATION FILTER AND AERATOR
Filed Oct. 2, 1963     4 Sheets-Sheet 2
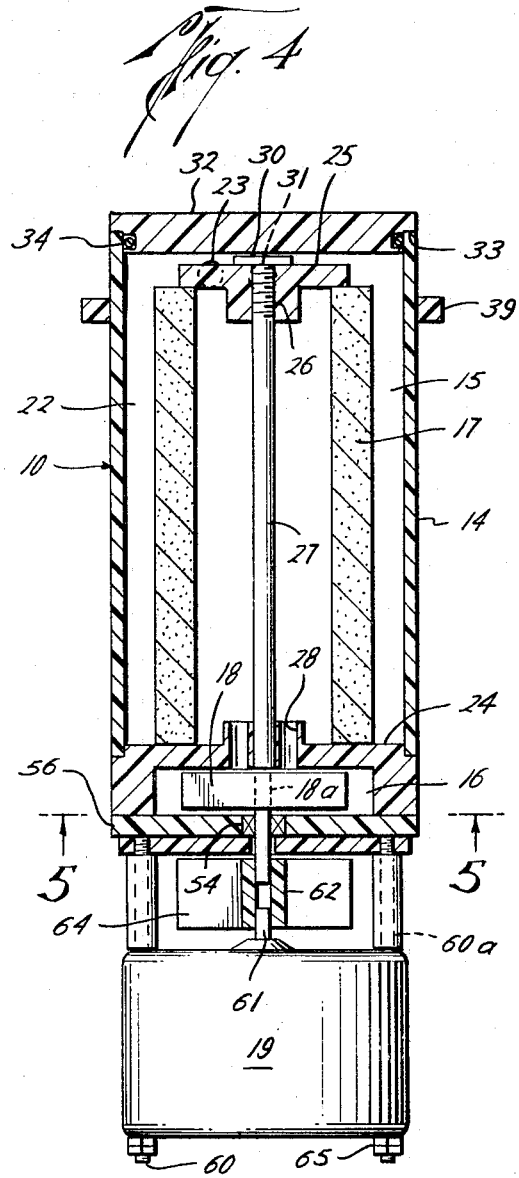
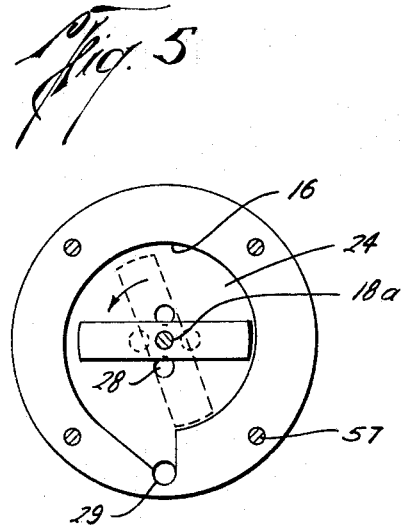
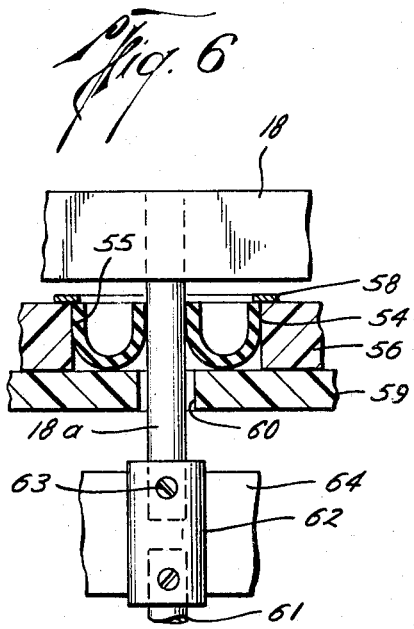
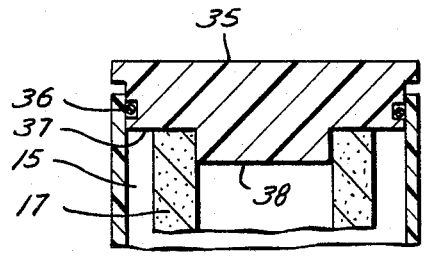
Howard M. Canterbury
INVENTOR.
BY Browning, Simmons,
Hyer & Eickenroht
ATTORNEYS Sept. 20, 1966 H. M. CANTERBURY 3,273,717
COMBINATION FILTER AND AERATOR Filed Oct. 2, 1963 4 Sheets-Sheet 3

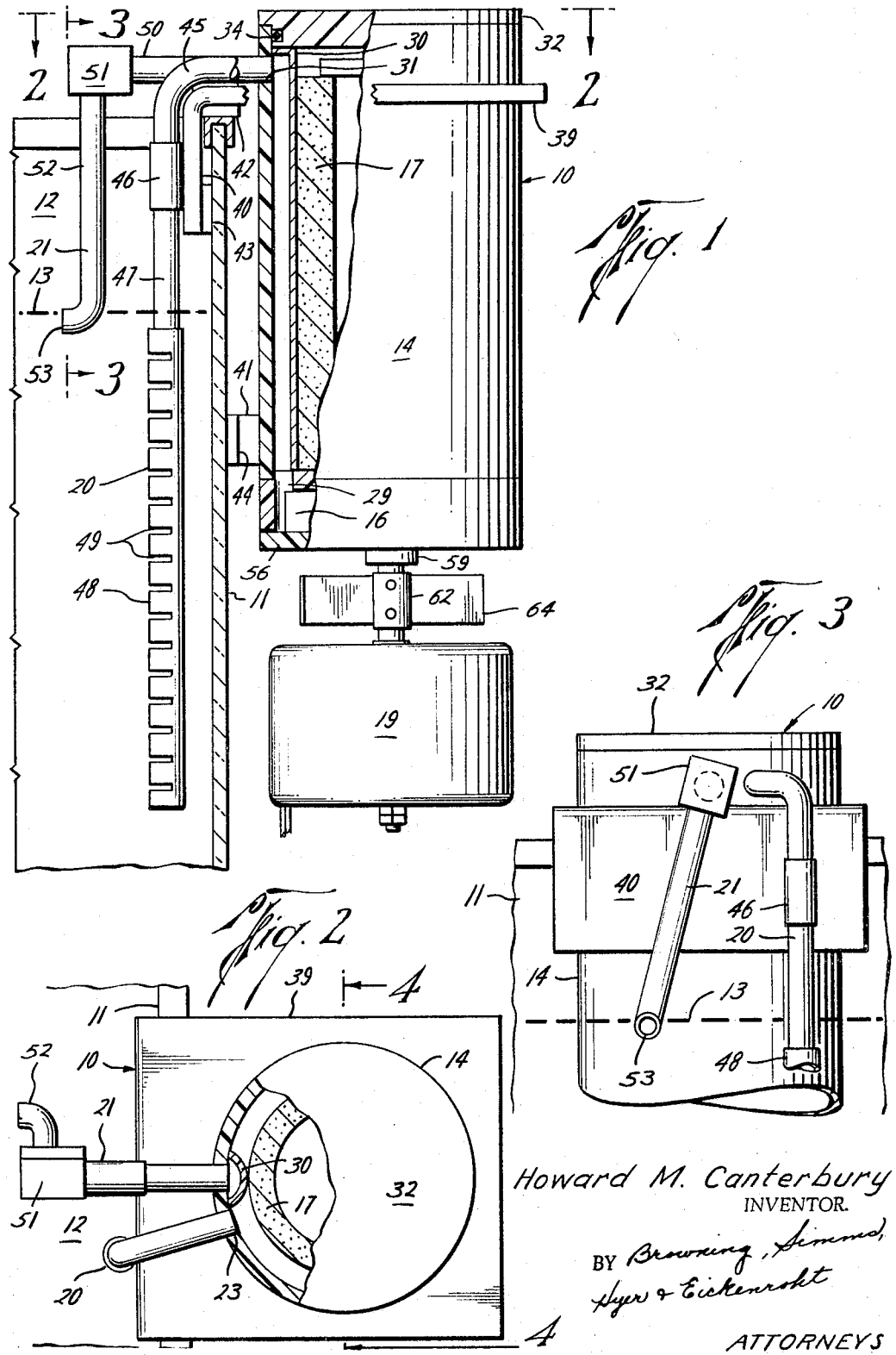

Howard M. Canterbury
INVENTOR.

BY
Browning, Simms, Hyer
& Eickenroht
ATTORNEYS

Sept. 20, 1966 H. M. CANTERBURY 3,273,717
COMBINATION FILTER AND AERATOR
Filed Oct. 2, 1963 4 Sheets-Sheet 4
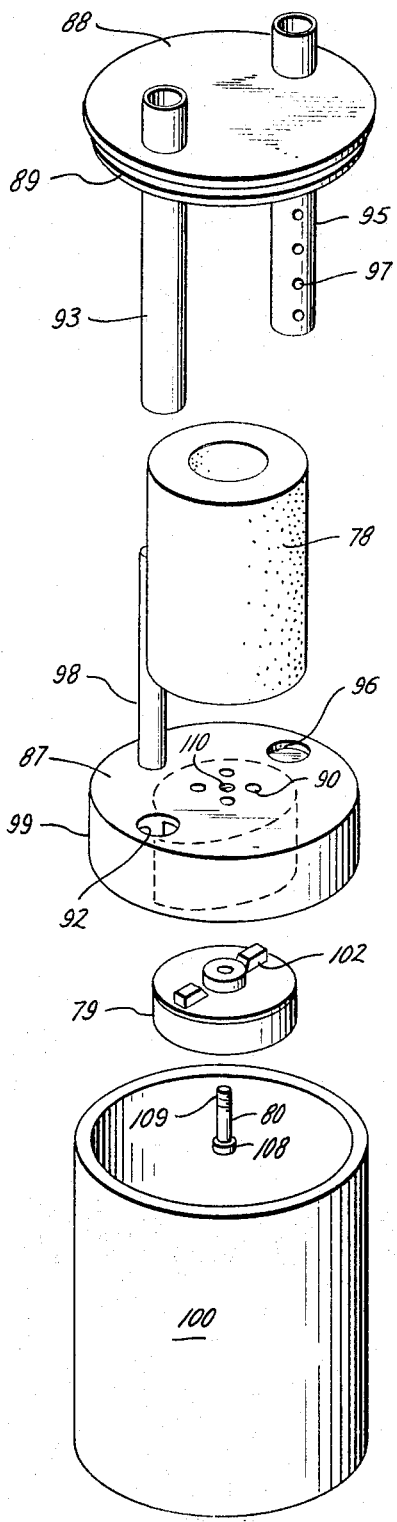
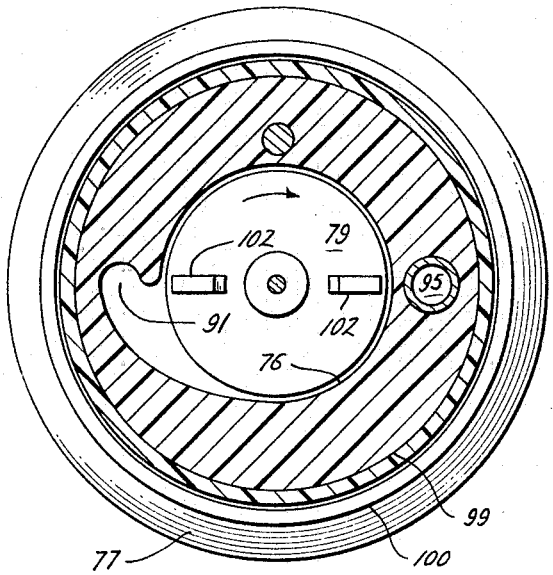
Fig. 9
Fig. 10
Howard M. Canterbury
INVENTOR.
BY
ATTORNEYS United States Patent Office 3,273,717
Patented Sept. 20, 1966

3,273,717
COMBINATION FILTER AND AERATOR
Howard M. Canterbury, Houston, Tex., assignor to
W. F. Wilson, Houston, Tex.
Filed Oct. 2, 1963, Ser. No. 313,260
12 Claims. (Cl. 210—169)

This invention relates to improvements in a combination filter and aerator for use in aquariums and the like.

Devices of this type include a pump which is driven by a small electric motor for circulating water within the aquarium for the purpose of aerating same. They also include a filter of some type through which the water is circulated in order to collect small particles which accumulate within the water. Obviously, these filters become clogged and must therefore be cleaned or replaced from time to time.

It is, of course, desirable to dispose these devices as close as possible to the aquarium; and it is therefore a widespread practice to mount them at least partially within the aquarium. This presents a number of problems, because it is desirable to dispose the filter above the motor, and preferably above the water level, as this facilitates its removal. On the other hand, disposal of the motor in the water has many obvious disadvantages, not the least of which are the problems of insulating it, the excessive heat which it would generate in the aquarium, and the danger due to the electrical conductivity of the water. Similar problems arise even when the motor is raised above the water level because a submerged pump may well generate so much heat as to kill the fish and also, unless insulated from the motor, might conduct electricity from the motor to the aquarium water being pumped through it. Furthermore, unless the pump is non-metallic, the metal which migrates from it may kill salt water fish.

On the other hand, I am not aware of combination filters and aerators which have been mounted outside of the aquarium with any degree of success. For one reason or another, their filters have been difficult to remove. Still further, these filters have been of such construction and so arranged as to require considerable force in circulating water through them. This will cause the filtered particles to penetrate deeply into the filter and thereby resist removal upon cleaning.

An object of this invention is to provide a combination filter and aerator which overcomes these difficulties in that its pump and motor are adapted to be mounted outside of the aquarium, and yet in which its filter is disposed for easy removal.

Another object is to provide a device of the character above described in which water from the aquarium is caused to circulate through the filter in such a manner that the particles filtered out do not penetrate deeply into the filter whereby it may therefore be cleaned with a minimum of effort and be used repeatedly.

A further object is to provide such a device in which all parts, including the water-circulating conduits, are easily accessible for cleaning and repair.

Still another object is to provide such a device in which all parts through which the water is circulated are electrically insulated from the electric motor for operating the pump.

A still further object is to provide a device of the type described which is of simplified construction and inexpensive to manufacture.

In the drawings wherein like reference characters are used throughout to designate like parts:

FIG. 1 is a side elevational view of one embodiment of a combination filter and aerator constructed in accordance with the present invention and mounted in operative position on a side of an aquarium, the filter and pump chamber being broken away in part;

FIG. 2 is a top plan view of the combination filter and aerator of FIG. 1, as seen along broken line 2—2 thereof;

FIG. 3 is an elevational view of part of the side of the combination filter and aerator shown in FIG. 1, as seen along broken line 3—3 thereof;

FIG. 4 is a longitudinal sectional view of such device, as seen along broken line 4—4 of FIG. 2;

FIG. 4A is a longitudinal sectional view of the upper end of the filter chamber of a modification of the combination filter and aerator of FIGS. 1 to 4;

FIG. 5 is a cross-sectional view of the device of FIG. 4, as seen along broken line 5—5 of FIG. 4, and showing the internal construction of the pump chomber;

FIG. 6 is an enlarged detailed view of a portion of FIG. 4, including the extension of the pump impeller shaft out of the pump chamber and its connection to the output shaft of the motor;

FIG. 9 is another cross-sectional view of the device of FIG. 7, and as seen along broken line 9—9 thereof; and FIG. 10 is an exploded view of the housing of the device of FIG. 7.

Figure 7:
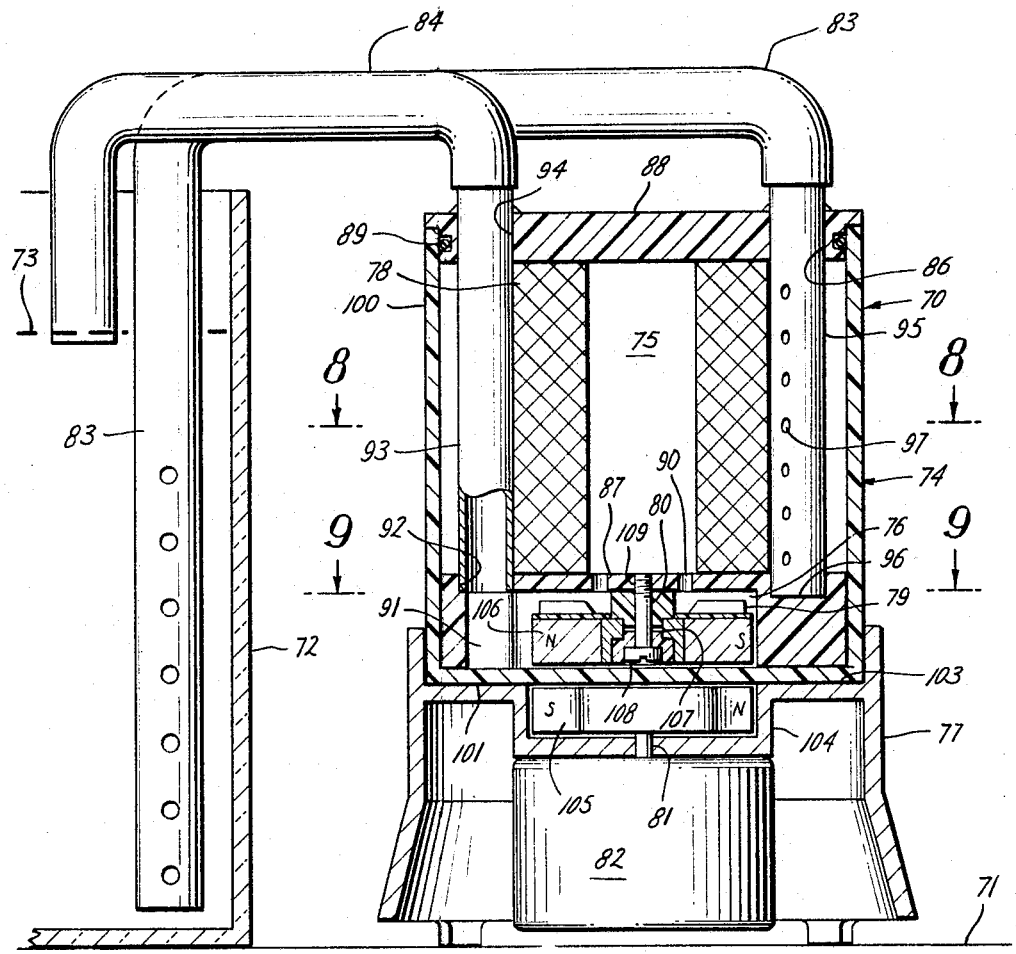
FIG. 7 is a longitudinal sectional view of still another embodiment of a combination filter and aerator constructed in accordance with the present invention, and mounted in an operative position to one side of an aquarium.

With reference now to the details of the above-described drawings, the combination filter and aerator of FIGS. 1 to 6, which is designated in its entirety by the reference character 10, is removably mounted on the side 11 of an aquarium 12 which is filled with water to a level 13. As shown in FIG. 1, it includes a cylindrical housing 14 having a filter chamber 15 disposed above a pump chamber 16 and with its upper end above the water level 13 when the device is in the upright position shown in the drawings.

There is a hollow, cylindrical filter 17 in the chamber 15 and an impeller 18 in the chamber 16 having a shaft 18a which is driven by means of a motor 19 connected to the lower end of the housing 14. In the operation of the device, which will be more apparent from the description to follow, water is drawn by the pump upwardly from the aquarium 12 through a suction tube 20 and into the filter chamber 15 for circulation through the filter into the pump chamber 16. The filter water is then pumped out of the pump chamber and by-passed through the filter chamber for return to the aquarium 12 through the discharge tube 21.

As best shown in FIG. 4, the filter 17 has an outside diameter smaller than the inside diameter of the filter chamber 15 to form an annulus 22 thereabout connecting at its upper end with an inlet 23 to the housing with which suction tube 20 is connected. The lower end of the filter is seated upon a wall 24 extending laterally across the housing 14 to separate the filter chamber from the pump chamber. The upper end of the filter 17 is closed by a disc or flange 25 threadedly connected at 26 to the upper end of a rod 27 extending upwardly from the wall 24 through the core of the filter. Thus, water from the aquarium is forced to flow through the filter from the annulus 22 into the core.

The lower end of the core of the filter 17 is connected with the pump chamber 16 by means of a plurality of ports 28 extending through the wall 24. More particularly, these ports connect with the pump chamber substantially centrally thereof and adjacent the shaft 18a about which the impeller 18 is rotated. Thus, during rotation of the impeller, water which has been drawn through these ports will be thrown outwardly to a port 29 at the periphery of the chamber. As shown in FIG. 1, this port connects with a by-pass conduit 30 extending upwardly through the filter chamber 15 for connection at its upper end with an outlet 31 in the side of the housing to which the discharge tube 21 is connected.

As shown in FIG. 5, the impeller 18 is rotated within the pump chamber in a counterclockwise direction, and the outer wall of the chamber is of a gradually increasing radius from a point just past the outlet port 29 to a point just ahead of such port. In this way, the end of the impeller is caused to pass closely adjacent the wall of the pump chamber as it passes the outlet port 29, thereby producing the desired pumping effect. Preferably, all parts of the pump as well as all parts of the filter chamber, suction tube and discharge tube are made of an electrically non-conductive material, such as molded plastic.

The filter 17 may be molded from a conventional filtering material, such as cellulose acetate, and in its preferred form includes particles of activated charcoal molded into it for purification purposes. I have obtained good results with a pump which draws approximately two inches of vacuum and a filter of five micron size. One considerable advantage of this arrangement is that the particles which are filtered out do not penetrate deeply into the filter, but instead lie substantially adjacent the outer surface thereof, so that the filter is easy to clean when removed from the filter chamber in a manner to be described.

In the embodiment of the invention shown in FIGS. 1 to 4, the upper open end of the filter chamber is closed by a removable cap 32 having an outer flange 33 for seating upon the upper end of the cylindrical portion of the housing and a reduced diameter portion beneath the flange 33 which carries an O-ring 34 or other sealing element for sealing with respect to the housing to close the filter chamber. Obviously, upon removal of the cap 32, the disc 25 need merely be removed from the upper end of the rod 27 to permit the filter 17 to be removed for cleaning or replacement.

It will also be noted that the upper end of bypass conduit 30 within the pump chamber 15 is open and terminates substantially adjacent the inner side of cap 32. Thus, the cap performs the additional function of normally closing the by-pass conduit so that water pumped upwardly from chamber 16 will be diverted through outlet 31 into the discharge tube 21. Furthermore, upon removal of the cap 32, the by-pass conduit 30 presents a straight run which may be cleaned without the necessity of dismantling it.

In the modified embodiment of the apparatus shown in FIG. 4A, the upper open end of filter chamber 15 is closed by a cap 35 which also carries a sealing ring 36 on a reduced diameter portion thereof for sealing with respect to the upper cylindrical portion of the housing when the pump is in place. However, in this embodiment of the invention, the upper end of filter 17 as well as the upper end of the by-pass conduit are closed by the inner side 37 of the reduced diameter portion of the cap 35 when the latter is moved into seated position. Thus, removal of the filter and access to the conduit merely requires prior removal of the cap 35. In addition, there is a guide stem 38 on the lower side of the reduced diameter portion of the cap which fits fairly closely within the core of the filter 17 so as to align it with respect to the pump chamber 15 when the cap is in place. In other respects, it is contemplated that this embodiment of the combination filter and aerator will correspond to that previously described.

The bracket for removably mounting the device upon the side 11 of the aquarium includes a horizontally disposed, rectangular portion 39 fixedly secured about the upper end of housing 14 and having a downwardly extending flange 40 which depends into the aquarium on the inner side of the wall 11. As shown in FIG. 1, a brace 41 is carried by a lower portion of the housing for engaging the outer wall of aquarium side 11 so as to hold the entire device in a substantially upright position. More particularly, the bracket portion 39 carries a pad 42 for resting on the upper edge of side 11 of the aquarium; the flange 40 carries a similar pad 43 for resting against the upper end of the inner wall of the side 11; and the brace 41 carries a pad 44 for engaging the outer wall of the aquarium side.

Each of the suction tube 20 and discharge tube 21 extend over the top side of the bracket portion 39 for connection with the inlet 23 and outlet 31, respectively, in the filter chamber. More particularly, the suction tube 20 includes an elbow 45 connected at its inner end to the inlet 23 and at its outer end to a coupling 46 which, in turn, connects with a straight section of tubing 47. An enlarged pick-up tubing 48 is adjustably fitted over the lower end of straight tubing 47 and has a plurality of saw slots 49 formed therein of such size as to admit water from the aquarium without sucking the fish into the tube. As can be seen from FIG. 1, the tube 48 is adjusted to dispose at least substantially all of it beneath the water level 13.

The discharge tube 21 includes a straight section of tubing 50 extending radially outwardly from the outlet 31 from the filter chamber and a coupling 51 which is rotatable about its outer end. A tube 52 extends from the lower side of rotatable coupling 51 and has an open lower end 53 adapted to be disposed just below the water level 13 so as to break the surface thereof for the purpose of aerating the water. As will be understood, this swingable coupling 51 enables the vertical level of the open end 53 of the discharge tube to be adjusted when, for example, water within the aquarium evaporates.

As previously mentioned, all of the parts thus far described are preferably made of an electrically non-conductive material, such as molded plastic. Thus, when the shaft 18a for the impeller 18 of the pump is electrically insulated with respect to the electric motor 19, there is no danger of the electricity from the motor being conducted to the water circulated through the device 10. Therefore, as shown in FIGS. 4 and 5, the impeller shaft 18a, which may be formed of carbon because of its self-lubricating characteristics, extends downwardly through a seal 54 in the lower side of the pump chamber 16. This seal comprises an annular seal ring which is U-shaped in cross section and is radially contained within an enlarged opening 55 through a plate 56 connected across the lower side of the upper body of the pump chamber by screws 57 (see FIG. 5). This seal 54 is restrained against upward movement by means of a retainer ring 58 about the opening 55 on the plate 56 and is restrained against downward movement by a bar 59 which has an enlarged opening 60 about the shaft 18a and through which screws 60a or the like extend for suspending the motor 19 from the bottom plate 56 of the pump chamber 16.

The motor 19 is thus mounted with its output shaft 61 extending coaxially of the impeller shaft 18a and with the opposite ends of these two shafts disposed close to one another. They are coupled together by a sleeve 62 of electrically non-conductive material, such as molded plastic, which sleeve is releasably connected to each shaft end by means of set screws 63. This sleeve carries wings 64 or the like for rotating with the shafts and thereby cooling the motor 19.

This coupling of the motor output shaft to the impeller shaft not only isolates the water within the device from the electric current of the motor, but also provides a convenient means for disconnecting the motor from the filter and pump. Thus, such disconnection merely requires removal of the nuts 65 about the lower ends of the screws 60a and the loosening of set screws 63. Furthermore, upon removal of the motor 19 from the lower end of the housing 14, access can be had to the interior of the pump chamber 16 merely by removal of the screws 57 to permit removal of bottom plate 56. Thus, all parts of the device are not only easily cleaned, but are also readily removed for repair or replacement.

The combination filter and aerator shown in FIGS. 7 to 10, and designated in its entirety by the reference character 70, is removably mounted upon a base 71 to one side of an aquarium 72 supported upon the same base and filled with water to a level 73. As shown in FIG. 7, this device includes a housing 74 having a filter chamber 75 disposed above a pump chamber 76 and mounted on a pedestal 77 with the upper end of the filter chamber above the water level 73 in the aquarium.

Similarly to the device shown in FIGS. 1 to 6, the device 70 includes a hollow cylindrical filter 78 in the chamber 75 and an impeller 79 in the pump chamber 76 of the housing 74. As shown in FIG. 7, and as will be described below, the impeller has a rotatable shaft 80 which is driven by the output shaft 81 of a motor 82 carried within the pedestal 77. Thus, in the operation of the device 70 as in the operation of the device 10, water is drawn by the pump upwardly from the aquarium 72 through a suction tube 83 and into the filter chamber 75 for circulation through the filter 78 and into the pump chamber 76. The filtered water is then pumped out of the pump chamber and by-passed through the filter chamber 75 for return to the aquarium through the discharge tube 84.

As can be seen from FIG. 7, the upper end of the filter is closed by the bottom side of a cap 88 which is removably disposed over the open upper end of cylindrical housing 74 and sealed with respect thereto by means of an O-ring 89 or the like fitting closely within the upper end of such housing. The outside diameter of the filter is smaller than the inside diameter of the filter chamber 75 so as to form an annulus 85 within the housing 74 connecting at its upper end with an inlet 86 through the cap for connection with the suction tube 84. The lower end of the filter is seated on a wall 87 which extends laterally across the housing 74 to separate the filter chamber from the pump chamber. Thus, when the pump is started, water from the aquarium is forced to flow through the filter 78 as it passes from the annulus 85 into the hollow core of the filter.

The lower end of the filter is connected with the pump chamber 76 by means of a plurality of ports 90 through the dividing wall 87. More particularly, these ports connect with the central portion of the pump chamber about the impeller shaft 80. Thus, during operation of the pump, water which has been drawn through the ports 90 will be thrown outwardly to a radially enlarged portion 91 of the chamber which in turn connects with a port 92 through the dividing wall 87. As shown in FIG. 7, the port 92 connects with a by-pass conduit in the form of a tube 93 which extends upwardly through the annulus 85 in the filter chamber for connection at its upper end with an outlet 94 from the housing through cap 88 for connection with the discharge tube 84.

As can be seen from each of FIGS. 7 and 10, the upper end of tube 93 extends through the outlet 94 so that it not only provides a by-pass through the annulus 85, but also a nipple extending from the upper end of cap 88 to which the discharge tube 84 is removably connected. In similar fashion, and again as best shown in FIGS. 7 and 10, another tube 95 extends through the inlet 86 to the housing to provide an upstanding nipple on the cap for connection to the suction tube 83. The tube 95 extends downwardly into the annulus 85 and preferably has its lower end located within a recess 96 in in the dividing wall 87. Also, there are ports 97 along the length of the tube 95 which direct water sucked up through the tube 83 onto the outer periphery of the filter 78, all of which is useful in keeping the exterior of the filter as clean as possible.

Figure 8:
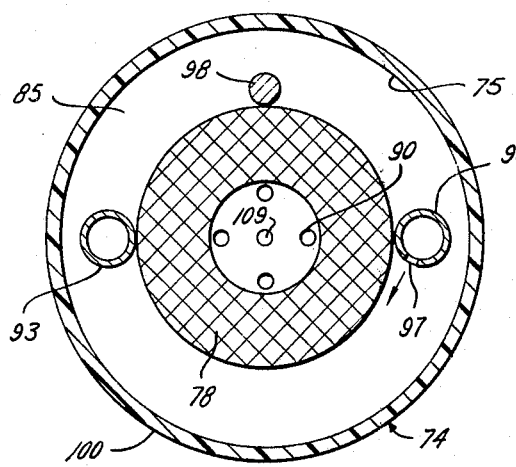
FIG. 8 is a cross-sectional view of the device of FIG. 7, as seen along broken line 8—8 thereof.

As best shown in FIGS. 7 and 8, the tubes are diametrically opposed and the outer diameter of the filter fits closely between them. Also, a post 98 is mounted at its lower end on the dividing wall 87, as best shown in FIG. 10, at a location intermediate the tubes 93 and 95. This post engages the back side of the filter 78 when it is moved between the tubes so as to at least substantially center the filter with respect to housing 74.

As can also be seen from FIGS. 7 and 10, the pump chamber is formed within a substantially cylindrical pump body 99 which is movable through the open upper end of the cylindrical body 100 of the housing 74. More particularly, the upper end of the pump body is closed to form dividing wall 87 and the open lower end thereof seats on the closed lower end 101 of the housing body 100. Thus, as will be apparent from FIG. 10, in the assembly of this device, the cap 88 is moved toward the pump body so as to fit the lower ends of the tubes 93 and 95 within the port 92 and recess 96 on the top side of dividing wall 87. The filter 78 is then moved sidewise between the tubes 93 and 95 and against the post 98, and the thusly assembled cap, filter and pump body are lowered through the upper end of the cylindrical body 100 so as to seat the lower end of the pump body 99 on the bottom wall 101 of the housing body 100 and to fit the cap 88 into the open upper end of such body.

As shown in FIG. 9, when the impeller 79 is rotated in a clockwise direction within the pump chamber 76, water admitted to the chamber through the ports 90 will be urged into the chamber portion 91, which is gradually enlarged in the same direction to its maximum radial extent at 91 adjacent the port 92 in the dividing wall 87. At this point, the wall of the pump chamber 76 abruptly returns to its minimum radial extent so that the impeller, and particularly the ends of the vanes 102 on the top side of the impeller, are caused to pass closely adjacent the wall of the pump chamber as they pass the port 92, thereby producing the desired pumping effect. Although the vanes 102 are useful in this respect, it has been found that the relatively close fit of the main body of the impeller within the pump chamber 76 will have a centrifugal effect in discharging water into the enlarged portion 91 of the pump chamber.

The pedestal 77 has a bowl 103 on its upper side into which the lower end of the housing body 100 fits rather closely. Thus, the entire housing 74 is quickly and easily removable from the pedestal to permit its disassembly for cleaning and repair. The motor 82 is suspended from the lower side of a recessed portion 104 in the bowl 103 of the pedestal, and the output shaft 81 of such motor extends through the wall into the recess for connection with magnets 105 disposed closely adjacent bottom wall 101 of the housing body 100. More particularly, the shaft 81 is susbtantially axially aligned with the shaft 80 of the impeller 79 within such housing body, and the magnets 105 are disposed substantially opposite magnets 106 about the impeller shaft and forming part of the cylindrical body of the impeller 79. More particularly, similarly to magnets 105, the magnets 106 are substantially adjacent the bottom wall 101, so that the thickness of the bottom wall is the only interference with the magnetic attraction between the magnets 105 and 106. Thus, as will be apparent from the foregoing description, the impeller is magnetically driven by motor 82, while, at the same time, the impeller shaft 80 and the other parts within the housing 75 are electrically insulated from output shaft 81 and other parts of the motor 82.

As best shown in FIG. 7, the magnets 106 as well as the vanes 102 of the impeller are carried about a split collar 107 which is carried from the head 108 at the lower end of the shaft 80. The end 109 of the shaft is in turn threaded into socket 110 in dividing wall 87, so that, upon removal of the pump body 99 from within the body housing 100, as previously described, the impeller is also quickly and easily removed and replaced, as desired.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A combination filter and aerator for an aquarium or the like, comprising a sealed housing, means for mounting the housing in an upright position exteriorly of the aquarium, means dividing the housing into a filter chamber above a pump chamber, a cap removably disposed over the upper end of and sealing the filter chamber, a filter in the filter chamber, an inlet to and outlet from the upper end of the filter chamber, a suction tube and a discharge tube for connecting the aquarium with the inlet and outlet, respectively, means connecting the filter chamber and pump chamber, said filter being disposed across the path of flow from the inlet to the pump chamber, means including a by-pass conduit within the filter chamber connecting the pump chamber with the outlet, and an impeller in the pump chamber for drawing aquarium water from the suction tube through the filter and into the pump chamber and then forcing it from said pump chamber into the by-pass conduit for return to the aquarium through the discharge tube.

2. A combination filter and aerator of the character described in claim 1, wherein each of the inlet and outlet extend through the side of the housing and the by-pass conduit has an open upper end which is at least substantially closed by the bottom side of the cap.

3. A combination filter and aerator of the character described in claim 1, wherein the suction tube includes a first section extending outwardly from the inlet to the filter chamber, and another section extending downwardly from the first section and swingably connected to the first section about a horizontal axis in order to adjust the vertical level of its lowermost end.

4. A combination filter and aerator of the character defined in claim 1, wherein each of the inlet and outlet extend through the cap, and said by-pass conduit comprises a tube connected with the outlet for removal therewith.

5. A combination filter and aerator for an aquarium or the like, comprising a sealed housing having a filter chamber at one end and a pump chamber at the other end and adapted to be mounted outside of the aquarium with the filter chamber above the pump chamber, a cap removably disposed over the upper end of and sealing the filter chamber, a hollow cylindrical filter in the filter chamber defining an outer annulus therein and having both open ends of its core closed, port means connecting the core of the filter with a central portion of the pump chamber, an inlet to and outlet from the upper end of the annulus about the filter in the filter chamber, a suction tube and a discharge tube connecting with the inlet and outlet, respectively, a port connecting a peripheral portion of the pump chamber with said annulus, a by-pass conduit extending through the filter chamber to connect the last-mentioned port with the outlet, and an impeller in the pump chamber for drawing aquarium water from the suction tube through the filter and into the pump chamber and then forcing it from said chamber into the by-pass conduit for return to the aquarium through the discharge tube.

6. A combination filter and aerator of the character described in claim 5, wherein there is a cylindrical guide on the bottom side of the cap for fitting closely within the upper end of the core of the filter to close same.

7. A combination filter and aerator of the character described in claim 5, including a rod extending upwardly through the filter, and a flange removably connected to the free end of the rod for covering and bearing upon the open upper end of the core of the filter to close it and hold the filter in place.

8. A combination filter and aerator of the character described in claim 5, including a tube extending downwardly from the inlet into the annulus and having ports therein for directing water from the suction tube about the periphery of the filter.

9. A combination filter and aerator of the character described in claim 8, wherein the by-pass conduit comprises a tube extending through the annulus at a position substantially diametrically opposed to the tube extending downwardly from the inlet and spaced therefrom a distance to closely receive the outside diameter of the filter, and a post extends within the annulus intermediate the tubes therein to locate the filter approximately centrally of the filter chamber.

10. A combination filter and aerator for an aquarium or the like, comprising an elongated, sealed housing for mounting exteriorly of the aquarium and having a filter chamber at one end and a pump chamber at the other end, an impeller rotatable on a shaft in the pump chamber, an electric motor having an output shaft at one end, means on the housing and motor for removably mounting the other end of the housing substantially adjacent the one end of the motor so as to dispose the impeller shaft and motor shaft in axial alignment, magnetic means on each of the shafts cooperating to drive the impeller shaft responsive to the motor shaft, and a suction tube and a discharge tube each for connecting the aquarium with the filter chamber and pump chamber, respectively, and flow means connecting the filter chamber and pump chamber of the housing and a filter disposed thereacross so that water drawn from the aquarium through the suction tube will be circulated through the filter and then returned to the aquarium through the discharge tube.

11. A combination filter and aerator for an aquarium or the like, comprising a sealed housing having a filter chamber at its upper end and a pump chamber at its lower end, a pedestal adapted to be mounted exteriorly of the aquarium and having a bowl on its upper side for removably mounting the lower end of the housing, an impeller rotatable on a shaft in a pump chamber of the housing, an electric motor carried by the pedestal and having an output shaft disposed substantially coaxially of the impeller shaft when the housing is mounted in the bowl of the pedestal, magnetic means on the impeller shaft and motor shaft for driving the impeller shaft responsive to the motor shaft, a suction tube and a discharge tube each for connecting the aquarium with the housing, and means connecting the filter chamber and pump chamber so that water drawn from the aquarium through the suction tube will be circulated through the filter and then returned to the aquarium through the discharge tube.

12. A combination filter and aerator of the character described in claim 11, wherein said housing comprises a body having a closed lower end and an open upper end, a cap removably disposed over the upper end of the housing body, and a pump body seatable on the closed end of the housing body and having an upper wall dividing the housing into the pump chamber and filter chamber, said pump body being removable upwardly through the open upper end of the housing body upon removal of the cap therefrom.

(References on following page)

References Cited by the Examiner

UNITED STATES PATENTS

| | | | |
|---|---|---|---|
| 2,137,397 | 11/1938 | Haldeman | 210—169 X |
| 2,275,428 | 3/1942 | Haldeman | 210—416 X |
| 2,335,756 | 11/1943 | Haldeman | 210—416 X |
| 2,515,538 | 7/1950 | Wall | 210—416 |
| 2,533,936 | 12/1950 | Holmes | 210—169 |
| 2,537,965 | 1/1951 | Cantin | 119—5 X |
| 2,737,490 | 3/1956 | Lambertson | 210—169 |
| 2,783,893 | 3/1957 | Romanoff | 210—169 X |
| 2,951,447 | 9/1960 | Cosassa | 103—220 X |

REUBEN FRIEDMAN, *Primary Examiner.*

F. MEDLEY, *Assistant Examiner.*